May 29, 1956 J. H. NICHOLAS 2,748,184
HIGH VOLTAGE ELECTRIC TERMINATOR
Filed April 4, 1951 5 Sheets-Sheet 1

INVENTOR.
James H. Nicholas

May 29, 1956  J. H. NICHOLAS  2,748,184
HIGH VOLTAGE ELECTRIC TERMINATOR
Filed April 4, 1951  5 Sheets-Sheet 2
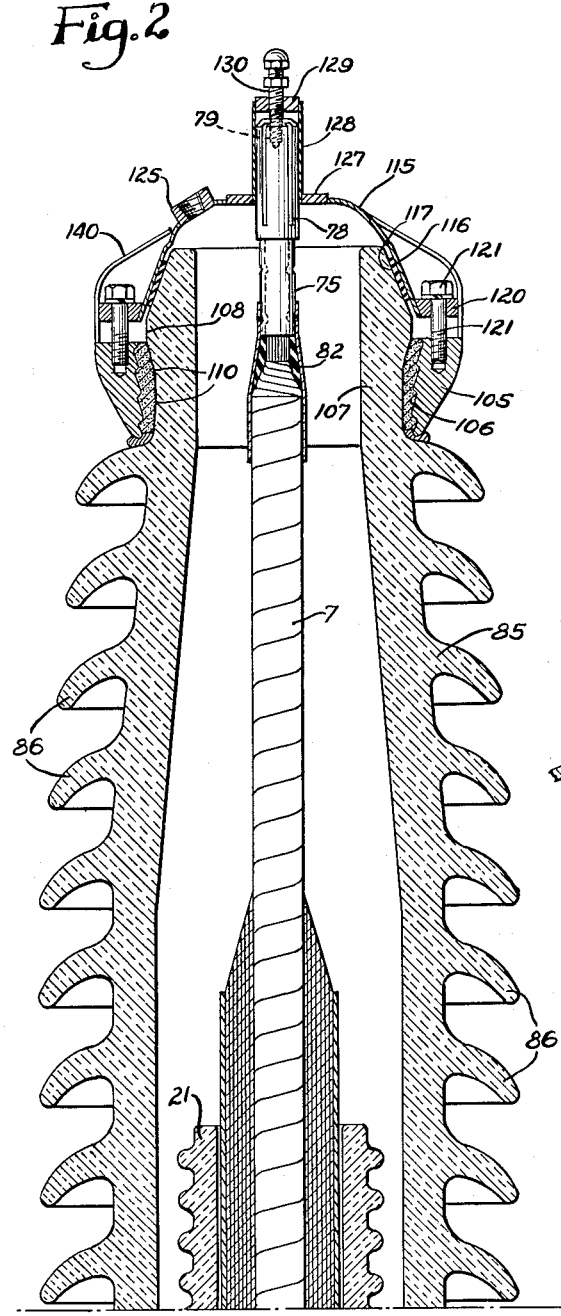
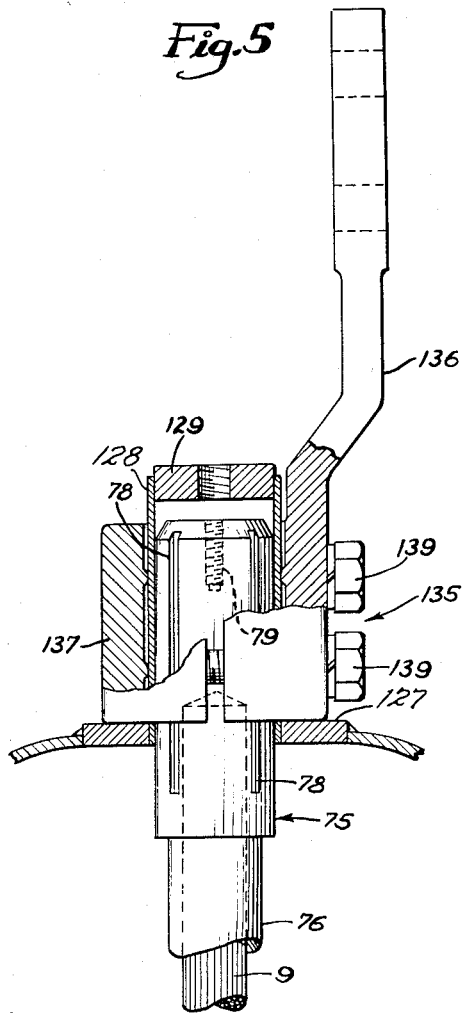
INVENTOR.
James H. Nicholas
BY 
Atty.

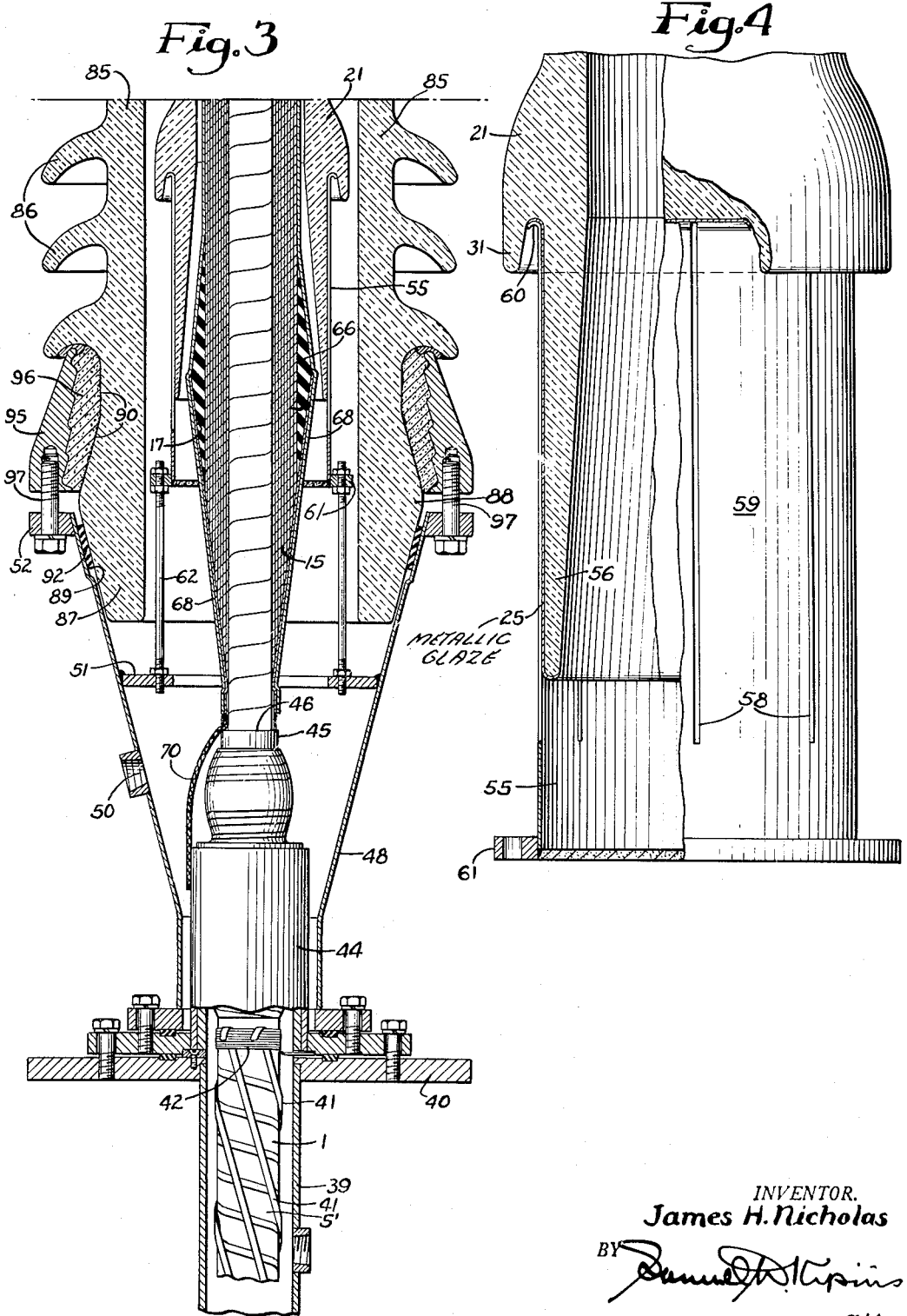

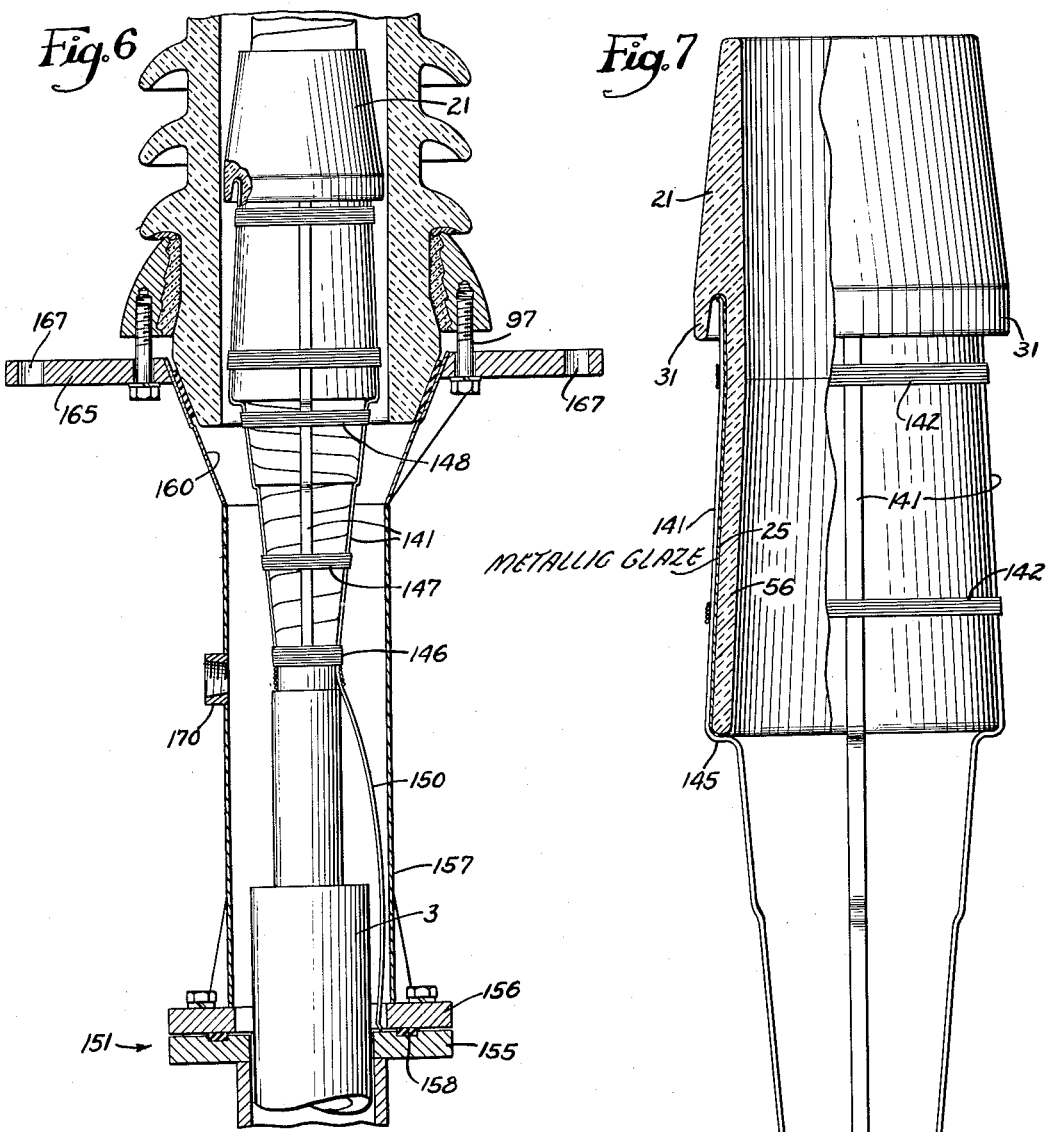

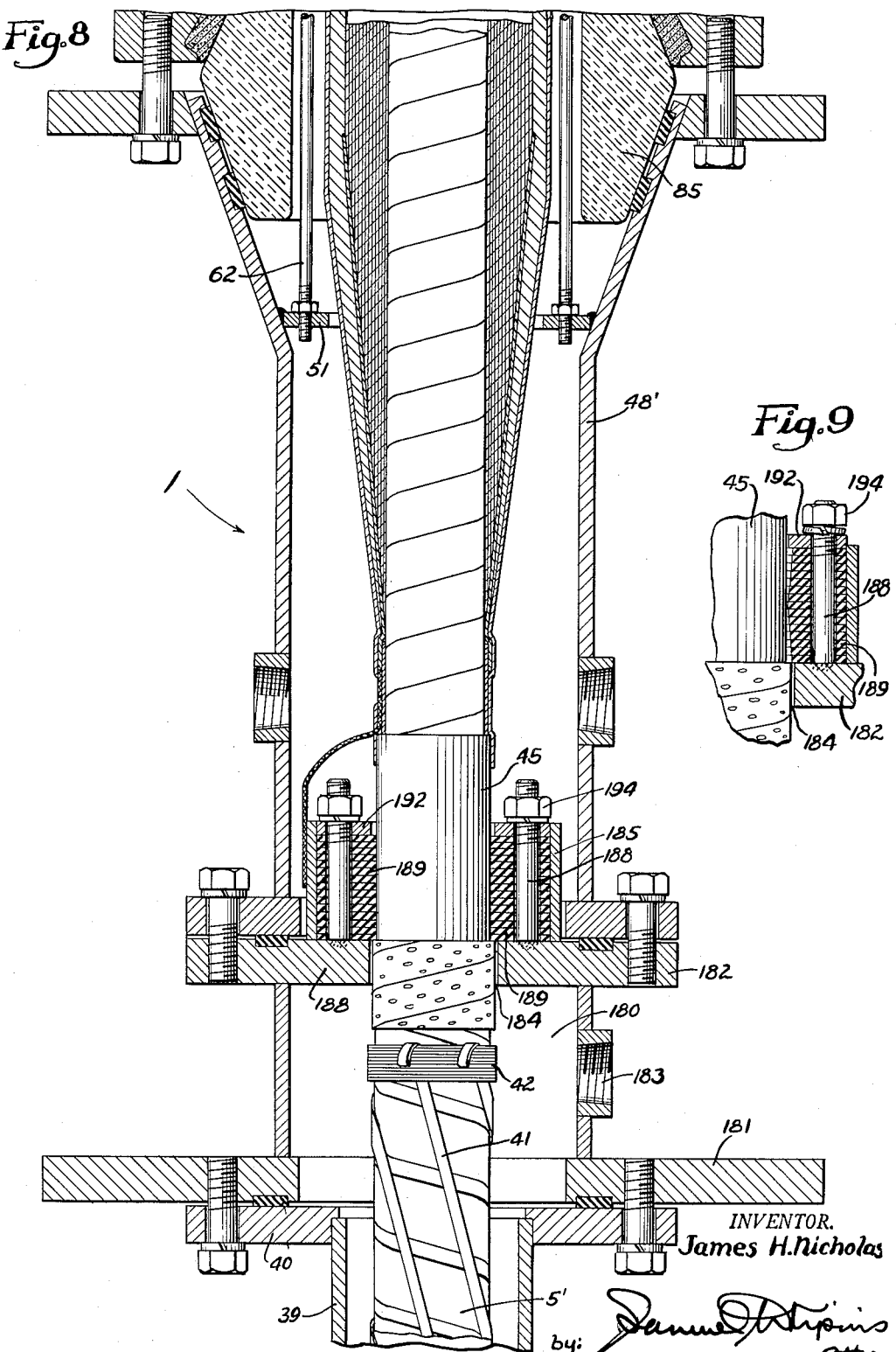

United States Patent Office 2,748,184
Patented May 29, 1956

2,748,184

HIGH VOLTAGE ELECTRIC TERMINATOR

James H. Nicholas, Chicago, Ill., assignor to G & W Electric Specialty Company, Chicago, Ill., a corporation of Illinois Application April 4, 1951, Serial No. 219,294

8 Claims. (Cl. 174—19)

This invention relates to high voltage electrical terminating devices and is particularly concerned with means for controlling the potential gradients in the insulation of such a structure so as to reduce the maximum potential gradients in those places or directions where the dielectric strength is minimum.

It is an object of the present invention to provide dielectric stress control means for a high voltage conductor terminator or the like which is so constructed and arranged as to obviate the need for very long internal insulators within the outer insulator of the terminator.

High voltage cables generally include wrapped insulation surrounding the cable conductor. In the preparation of the cable conductor for the formation of the terminator the wrapped insulation is overlaid by a stress cone, also of wrapped insulation or its equivalent, and which cone is covered at one end with grounded shielding braid. It is known that the dielectric strength of wrapped insulation in an axial direction is only a small fractional part of the dielectric strength of the same insulation in a radial direction. This percentage may be as low as five or six percent. Therefore, at high electrical stress dielectric breakdown may occur in an axial direction unless means is provided to reduce the dielectric stress in that direction. In order to reduce the possibility of dielectric breakdown in an axial direction it is an object of the present invention to provide means for controlling the direction of the equipotential surfaces in the stress control cone. The control is such that, at the region of maximum dielectric stress the equipotential lines or surfaces are in a direction that approach as nearly as possible a direction axially of the cable conductor. If it were possible to make the equipotential surfaces extend truly axially of the wrapped insulation then there would be no axial dielectric stress. To the extent that this is not accomplished there is stress in an axial direction. If this stress does not exceed five or six percent of the maximum radial stress of the cable insulation the optimum conditions are obtained because under those circumstances the dielectric strength of the wrapped insulation is as effective in an axial direction as in a radial direction. This object of the present invention is accomplished, in accordance with one embodiment of the present invention, by locating a conducting surface or electrode at ground potential in close proximity to the grounded shielding braid on the stress control cone, and by introducing between that grounded electrode and the stress control cone a stress control tube consisting of a solid inorganic homogeneous insulator of high dielectric properties in all directions, such as, for instance, a wet process porcelain insulator. The porcelain insulator is placed as close as possible to the insulator on the cable, allowing only enough space between them for the free expansion of the cable conductor and its wrapped insulator under temperature changes that occur in the terminator. The grounded electrode is in intimate contact with the porcelain insulator, and may consist of a metallic glaze at the proper surface of the porcelain insulator. The metallic glaze forms a conducting surface surrounding the porcelain stress control tube. The stress control tube extends a sufficient distance above the grounded portion of the wrapped cable insulation and above the conducting glaze to impart the proper direction to the equipotential surfaces in the wrapped dielectric around the cable conductor. The arrangement is such that the equipotential surfaces in the cable insulation wrapping approach an axial direction so that the electrostatic gradient in an axial direction is minimum. Since very high potential gradients can be readily withstood by a properly designed porcelain tube, the present invention provides a structure wherein the maximum potential gradients in an axial direction occur within the porcelain instead of within the wrapped cable insulation.

It is known that wet process porcelain can withstand a higher potential gradient than can the usual insulating oils or compounds that are used in high voltage terminators. It is therefore an object of the present invention so to terminate the stress control grounded electrode that surrounds the porcelain stress control tube that the maximum dielectric stress around the electrode will be in the porcelain body rather than in the liquid dielectric. The porcelain covers that end of the stress control electrode where the stress is greatest and keeps the oil away from the region of maximum dielectric stress. If the oil were not kept away from that region there would be a breakdown of the film of oil in immediate contact with the stress control electrode at the place of maximum stress. The "breaking down" would result in carbonization of the oil with the formation of a partially conducting surface or film. Under continuous high voltages or repeated surge potentials this carbonization could be progressive finally resulting in complete electrical failure along the surfaces between ground potential and line potential electrodes. This is prevented by terminating the grounded electrode within the body of porcelain.

It is a further object of the present invention to provide an improved means for securing a mounting clamp to an insulator, particularly one that is to be subjected to high internal pressure. The outer supporting insulator of a terminator of the present invention has at one end thereof a neck for receiving a metal adaptor for mounting the insulator. The adaptor consists of a ring that is slipped over the end of the insulator making a very loose fit therewith, and is then cemented to the insulator. This adaptor or clamping ring is to be used for very tightly clamping the insulator against gasketing means to produce a seal against leakage of oil which is under high pressure. The clamp holds the insulator against the gasketing means, opposing the action of the pressure within the insulator which tends to move the insulator away from the gasketing means. For best results it is desirable that the forces between the clamp and the insulator shall be as nearly as possible in an axial direction. In order to accomplish this result the insulator neck is roughened to provide a good bond with the cement between the insulator neck and the adaptor. In addition, the insulator neck is formed with a slight outward taper towards the base of the adaptor, which facilitates holding the cementitious material against slipping axially of the insulator and at the same time transmits the stresses between the adaptor and the insulator in a direction having the major component axially of the insulator.

It is a still further object of the present invention to provide an improved means for forming a liquid tight seal with the insulating jacket of a high voltage cable. High voltage cables are frequently jacketed with an insulator known in the trade as polyethylene. When such insulator is subjected to high mechanical pressure over prolonged periods of time it tends to flow. Pressure seals around such jackets therefore tend to develop leaks. To overcome this difficulty I propose to use a pressure seal wherein the pressure is graded gradually from a maximum to zero, so that there is no big pressure gradient. I propose to use a stack of gasket discs surrounding the insulated conductor, the gaskets being made of material which when compressed tends to flow. The gaskets are confined against outer radial flow so that upon compression they will flow radially inwardly into pressure engagement with the surrounded insulated cable. The gasket discs are of different sizes as to their internal diameters, the center one being of minimum internal diameter and the successive discs on opposite sides of the center disc being of progressively larger internal diameters. When such a gasket stack is compressed into engagement with the surrounded polyethylene jacket there is formed a seal wherein the gaskets are in pressure engagement with the cable insulation, but there is a pressure gradient so distributed that the pressure is minimum at the opposite ends of the stack of gaskets and maximum at the center of the stack. As a result, the tendency of the polyethylene insulation to flow is substantially reduced, if not entirely eliminated, because at the center where the pressure is the greatest the polyethylene is prevented from flowing by reason of the adjacent sealing discs that confine the polyethylene with progressively reduced pressures, so that at the ends of the stack the pressure is so low that flow of the polyethylene does not take place.

It is a still further object of the present invention to provide an improved means for electrically connecting the bared end of a cable conductor in a cable terminating structure so that the structure can be sealed and proper external electrical connections can thereafter be made.

The attainment of the above and further objects of the present invention will be apparent from the following specification taken in conjunction with the accompanying drawings forming a part thereof.

In the drawings:

Figure 1 is a diagrammatic view of a portion of a cable terminator, in partial section, for the purpose of illustrating the principles of the present invention;

Figures 2 and 3, when placed one above the other and in longitudinal alignment, are a longitudinal section of a terminator embodying the present invention;

Figure 4 is a fragmentary enlarged side view, in partial section, of the stress control tube of the terminator of Figures 2 and 3;

Figure 5 is a view, in partial elevation and partial longitudinal section, showing the terminal lug connection at the end of the terminator of Figures 2–3;

Figure 6 is a longitudinal sectional view of the bottom portion of a terminator having a different support for the stress control tube;

Figure 7 is an enlarged elevational view, in partial section, of the stress control tube of Figure 6 and the support therefor;

Figure 8 is a longitudinal sectional view of the lower portion of a terminator of the present invention illustrating an alternate sealing arrangement; and Figure 9 is a fragmentary sectional view of a portion of the sealing means of Figure 8.

Reference may now be had more particularly to the drawings wherein like reference numerals designate like parts throughout.

Figure 1:
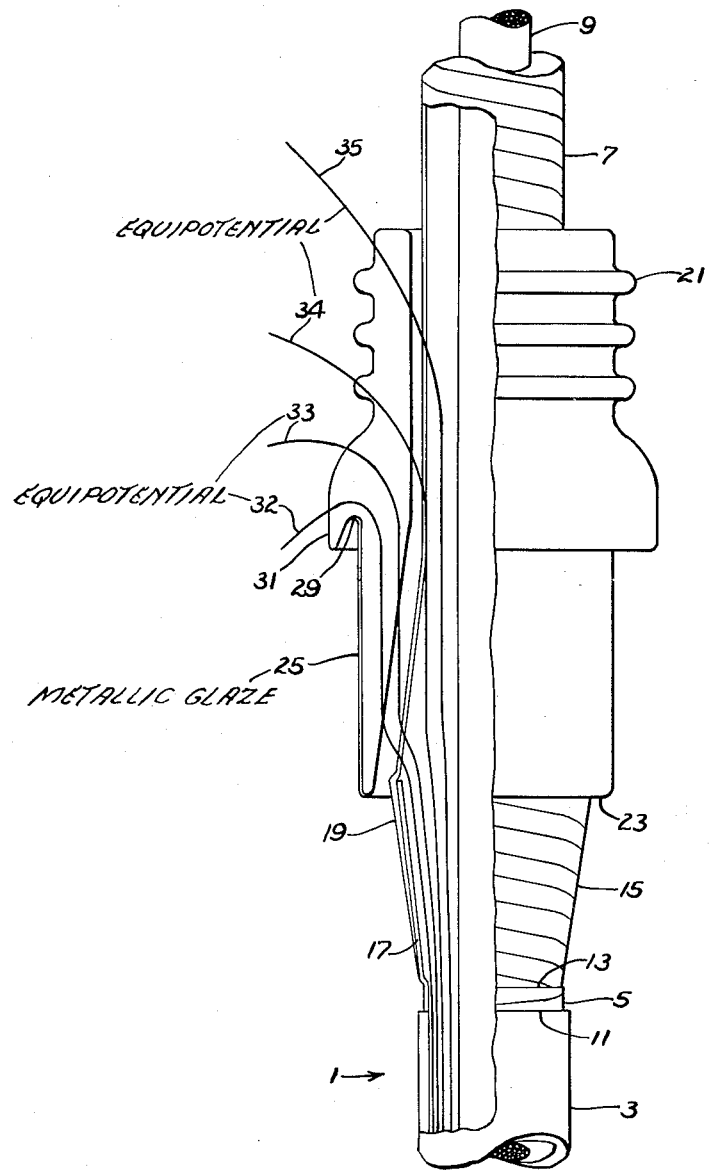

In Figure 1 there is shown, diagrammatically, a portion of a cable terminator where the electrostatic stress control of the present invention is applied. The end of a cable that enters the terminator is indicated at 1, said cable including a tubular jacket 3, of polyethylene, within which there is the usual grounded cable shielding tape 5 that surrounds the wrapped cable insulation 7 around a cable conductor 9. The jacket at the end of the cable is removed in the usual manner to end at 11, and the shielded tape is removed to end at 13, as is usual in preparing the end of the cable for connection within a cable terminator. Thereafter a stress cone insulation 15 is formed around the cable insulation 7. The ground connection of the shielding braid 5 is continued by a wrapping of metal braid 17 which continues up to and slightly beyond the point of maximum diameter of the stress cone and which is then covered by a wrapping of cover insulation 19. A stress control tube 21 of high grade ceramic insulation, such as wet process porcelain, is positioned over the insulated cable conductor, with the lower tubular portion 23 of the stress control tube extending below the top of the grounded shielding braid 17. The outside of the lower cylindrical portion 23 has a conducting metallic glaze 25 formed thereon, which glaze is electrically connected as by a conductor to the grounded portion at the end of the cable. The conducting glaze 25 is in intimate contact with its subjacent porcelain surface so that there are no pockets whatsoever between it and the porcelain surface. The upper end of the conducting glaze terminates at 29 within the body of the porcelain stress control tube, said body having an overhanging portion 31 that overhangs the top of the conducting glaze 25. The structure of Figure 1 is enclosed within the usual porcelain insulator or housing that is customarily provided on terminators. One end of the housing is grounded and the opposite end is connected to the cable conductor 9, as will be more fully explained as this description proceeds.

The electric field pattern of Figure 1 illustrates the action of the stress control tube in reducing the electrical stresses at the stress cone shielding braid. Equipotential lines 32, 33, 34 and 35 indicate, approximately, the voltage division between the cable conductor and ground at 12½%, 25%, 50% and 75%, respectively, of the cable to ground voltage. The potential gradient or dielectric stress in a particular zone is indicated by the distance between an equipotential line and an adjacent electrode, or between two adjacent equipotential lines.

It is known that the dielectric strength of wrapped insulation in the axial direction is only a small fractional part of the strength in the radial direction, say, of the order of five or six percent. Therefore, it is important that the distance between adjacent equipotential lines in an axial direction shall be substantially greater than the distance between the same equipotential lines in a radial direction, to reduce the probability of breakdown, particularly precisely at the place or places where the dielectric stress is greatest. In the present invention this is accomplished by providing a grounded conducting glaze 25, which acts as an electrode, so located with respect to the grounded shielding braid 17 that in the region of the termination of the grounded shielding braid 17 the distances between the end of the braid 17 and the equipotential lines 32 as well as the distance between the equipotential line 32 and the equipotential line 33 is substantially greater in the axial direction than in the radial direction. This results in a reduction of the axial dielectric stress, where the dielectric strength of the wrapped insulation is minimum. It results in locating of the maximum dielectric stress between the grounded end 29 of the conducting glaze and the equipotential surface 32 within the porcelain of the stress control tube. Porcelain, being a homogeneous body of excellent dielectric properties in all directions, is better able to take the maximum stress than is the stress cone insulation in the axial direction.

Since the maximum potential gradients can be readily withstood by a properly designed porcelain stress control tube, the porcelain stress control tube can be used for two purposes, namely:

(a) Reduce axial stresses in the wrapped insulation of the stress cone and force the maximum axial potential gradient to occur in the porcelain dielectric;

(b) Raise the external (outdoor air) flashover value by locating the termination of the conducting glaze well above the external metal grounded parts supporting the pothead outer porcelain.

For example, an eight inch axial shift in the location of the porcelain stress control tube 21 above the external metal grounded supporting parts of the outer pothead porcelain in a 161 kv. pothead raised the external impulse flashover value from 625 kv. to 775 kv. Of course, shifting of the location of the porcelain stress control tube 21 with respect to the external metal grounded parts of the pothead necessitates corresponding shifting of the stress control insulation 15 so that the grounded shielding braid 17 of the stress cone insulation terminates in close proximity with the bottom of the conducting glaze 25.

The structure of Figure 1, as previously set forth, is mounted within a porcelain insulator that is filled with poured insulation, such as oil or insulating compound, as is usual in the art. The point of maximum dielectric stress is at the upper end of the conducting glaze 25 which terminates in the porcelain tube and not in the oil or compound of the terminator. Insulating liquids such as are used in potheads have a tendency to break down at the place where they are subjected to an excessive dielectric stress. In the absence of the porcelain stress control tube this would occur at the film of oil that would be present at the outer top surface of the grounded conducting glaze or electrode 25. The "breaking down" would result in carbonization of the oil with the formation of a partially conducting surface or film. Under continuous high voltages or repeated surge potentials this carbonization could be progressive finally resulting in complete electrical failure along the surfaces between ground potential and line potential electrodes. By the present invention this is eliminated because porcelain does not break down as would oil, and the metal glaze terminating within the body of porcelain prevents local break down.

Reference may now be had more particularly to Figures 2 and 3 which shown a longitudinal section of a terminator embodying the present invention. In this structure the end of the cable 1 extends into and through a grounded pipe 39 that is welded to a mounting plate 40. In use the pipe is filled with an insulating oil or compound under pressure. The conventional cable skid wires 41 that surround the bronze tape grounded sheath reinforcement 5' are terminated at a grounded metal wire wrapping 42, and the end of the cable is sealed against oil transfer between the terminator and the pipe 39 in any conventional manner, as by a seal within an outer grounded cylindrical metal casing 44. A conventional jacket of insulation of the type known as polyethylene, which is provided in cables of the type here concerned, is indicated at 45, said jacket being cut away to terminate at 46. The casing 44 is sealed around the opening through which the jacket 45 extends. A stainless steel conical body 48 is secured to the mounting plate 40 and suitably gasketed to provide a liquid-tight seal, said conical body 48 being also grounded. The conical body 48 has an oil filling or draining plugable outlet 50 tapped to receive a pressure type fitting. A metal ring 51 is welded within the body 48 for supporting the porcelain stress control tube 21, as will be more fully set forth. A metal mounting ring 52 is welded to the top of the body 48 for facilitating mounting of the external porcelain tube insulator of the pothead in place.

The porcelain stress control tube 21 is supported by a cylindrical spun copper tube bracket 55 into which the bottom cylindrical portion 56 of the stress control tube 21 fits snugly. To facilitate gripping of the insulator the upper end of the bracket 55 has a number of longitudinal saw cuts 58 therein forming resilient spring fingers 59 that grip the lower sleeve portion 56 of the porcelain stress control tube and not only support it but also provide a ground connection to the conducting glaze 25. The upper end of the bracket 55 is outwardly flared along smooth curves to form a peripherally extending lip, as indicated at 60, which lip constitutes a bearing support for the stress control tube 21. The tube 55 has a metal mounting ring 61 welded or otherwise secured to the bottom thereof, which ring is supported by a series of bolts 62 that thread into the ring 51 and at their upper ends have nuts on which the ring 61 rests and is held in place by upper threaded nuts, as shown in Figure 3.

The stress cone, indicated at 15, consists of an impregnated wrapped paper tube tightened on the cable during installation. Varnished cambric or crepe paper insulation 66 is then wrapped around the tube and thereafter the shielding metal braid 17 is applied. This braid is wrapped around the outer surface of the impregnated paper tube and of the varnished crepe paper insulation 66 to form a complete covering therefor, and is extended to a height slightly above the position to be occupied by the bottom of the porcelain stress control tube 21. The metal shielding braid 17 is grounded by a copper braided wire 70 that extends between and connects the metal braid 17 and the grounded casing 44. The grounded shielding braid 17 is then wrapped with several layers of cover insulation 68.

The upper end of the cable conductor 9 is stripped of its insulation in the usual manner and has a cylindrical compression ferrule 75 secured thereto. The compression ferrule consists of a solid cylindrical block of copper having a centrally located longitudinal bore into which the bared, cleaned end of the conductor 9 is forced and makes a snug fit. Thereafter the ferrule is compressed to compress it into firm mechanical and electrical engagement with the inserted end of the cable conductor. To facilitate this action the lower end of the ferrule is of a reduced diameter, as indicated at 76. The outer surface of the ferrule has four longitudinally extending grooves 78 therein spaced, say, 90° apart, for a purpose which will be pointed out as this description proceeds. At its top the ferrule has a centrally located longitudinally extending tapped hole 79. A wrapping of insulation 82 extends between the wrapped cable insulation 7 and the compression ferrule 75.

An outside insulator tube 85 of ceramic material, such as wet process porcelain, encloses the major parts of the unit. The insulator is circular in cross section and is provided with the usual peripherally extending stress controlling flanges or petticoats 86. The bottom of the insulator has a neck portion 87 that has a peripherally extending thickened portion 88 forming two opposite facing frusto conical surfaces 89 and 90, each at a small angle, of the order of 15°, with the longitudinal axis of the tube 85. The surface 89 extends into and rests on the upper end of the conical body 48, being spaced therefrom by a suitable sealing or retaining gasket ring 92. An annular metal mounting adaptor 95 in the form of a continuous ring is cemented to the insulator 85 as by a body of cement 96. The opening in the adaptor 95 is of a diameter greater than the diameter of the thickened portion 88 so that in assembling the adaptor on the insulator it can be slipped into position, and can then be secured in place by the filling of the cementitious material 96. To facilitate bonding of the cementitious material with the insulator the surface of the insulator is roughened at 90, as by sand coating applied during porcelain manufacture. The smooth chocolate glaze which is over the remaining surface of the insulator is not necessary nor desirable at the place where the adaptor is secured to the insulator.

The adaptor serves to mount the insulator on the conical body 48, the insulator being secured to the conical body by a series of bolts 97 that extend through holes in the metal mounting ring 52 and thread into tapped holes in the adaptor 95. The bolts 97 are uniformly spaced around the periphery of the adaptor. The adaptor is drawn tight towards the mounting ring 52 by tightening of the bolts 97 to force the conical surface 89 of the insulator 85 into firm pressure engagement with the frusto conical ring gasket 92. In use the terminator is filled with an insulator oil or compound which may be under considerable pressure. It is important not only to avoid leakage but also to provide a structure such that the pressure of the liquid within the terminator and the compression of the bottom of the insulator towards the body 48 are not so additive as to produce a high component in a direction tending to break or shear the insulator. In the present instance the pull of the adaptor 95 under the action of the bolts 97 is transmitted to the neck 87 of the insulator through the cement which is bonded with the roughened surface 90 and which bears on the outwardly inclined upper surface of the thickened portion 88. The compressive force thus acts on the insulator in a direction such that its major component is axial compression.

At its upper end the insulator 85 has a one piece adaptor ring 105 secured thereto. This ring is of substantially the same construction as is the ring 95 and it is cemented to the insulator in the same manner as is the adaptor 95, namely, by a body of cement 106 which is bonded to a roughened surface 110 extending around the periphery of a neck 107 at the top of the insulator, which neck also includes an outwardly extending peripheral portion 108 similar to the portion 88 previously described, and with the surfaces of the portion 108 at approximately 15° to the longitudinal axis of the insulator 85.

A stainless steel cap 115 is secured over and closes the top of the insulator 85. This cap has a frusto conical skirt portion 116 that, by means of a frusto conical gasket 117, seats on and seals around the top of the insulator 85. A ring 120 that is welded to the bottom of the skirt 116 receives a number of bolts 121 that are threaded into the adaptor 105 to clamp the cap 115 into liquid tight sealing position around the top of the insulator. The bolts 121 are uniformly spaced around the ring 120 there being six or eight, or any other required number of such bolts. The cap 115 is provided with a tapped boss 125 for receiving a pressure type fitting.

The cap 115 has a central circular plate 127 welded thereto, which plate has a central hole into which a thin copper tube 128 is silver soldered. A tapped plug 129 is silver soldered at the upper end of the tube 128. A screw 130 threads through the tapped hole in the plug 129 and into the tapped bore 79 in the ferrule 75 for holding the ferrule in place, as during shipment of the parts. When the parts are assembled the ferrule fits snugly within the copper tube 128, and the tube is then clinched against the ferrule to lock the two together in firm mechanical and electrical engagement. The saw slots 78 are provided in the ferrule to permit escape of air from the top of the cap when the terminator is being filled with insulating oil or compound. After the terminator assembly has been completed the tapped hole in the plug 129 may be sealed as by solder.

A two piece terminal clamp 135 comprising a clamping lug 136 and a clamp shoe 137 are drawn together and in firm pressure engagement with the tube 128 by pairs of bolts 139—139. This establishes electrical connections from the lug, through the tube 128 and ferrule 75, to the cable conductor. A metal corona shield 140 completes the electrical connection from the cap to the adaptor 105.

Reference may now be had more particularly to Figures 6 and 7 which show an alternate method of mounting the porcelain stress control tube 21 within the insulator 85. In this instance the stress control tube 21 has a lower cylindrical portion 56 as before, that is covered with a conducting metal glaze 25 as previously described, and provided with an overhanging portion 31 as before. The insulator is supported by four identical phosphor bronze straps or wires 141 spaced 90° apart and secured to the portion 56 of the porcelain stress control tube by two or more wrappings of wire 142—142. These wrappings of wire are soldered over each metal support 141 and hold the metal supports snugly against the metal glaze 25. Intermediate the top and bottom of each support 141 there is a bend 145 that serves to position the wire with respect to the bottom of the insulator tube 21.

At their bottoms the supports 141 closely embrace the stress cone insulator and are secured thereto by wrappings of wire 146, 147 and 148, these wrappings also being soldered to the supports 141. A grounding wire 150 is connected at its upper end to one of the supports or to the wire wrapping 146 and at its lower end to the stainless steel adaptor 151 through which the cable extends. The adaptor includes a peripheral flange 155 to which is bolted a ring 156 at the bottom of a stainless steel body 157, a suitable ring sealing gasket 158 being provided between the two. The body 157 corresponds to the body 48 previously described, and is flared outwardly at its top to form a frusto conical body portion 160 the top of which has a metal mounting ring 165 welded thereto, said ring having bolt holes for receiving the insulator mounting bolts 97, and holes 167 for mounting the body in place. The tubular portion of the body 157 has a tapped boss 170 to form a pressure type fitting to facilitate filling or flushing the terminator.

High voltage cable terminators of the type above referred to are frequently maintained under very high oil pressure. It is therefore necessary to provide a first class seal between the terminator and the cable sheath to prevent the ebb and flow of oil from the cable to the terminator, and vice versa, due to expansion and contraction as the system heats and cools. High voltage cables are generally provided with a sheath of plastic insulation of the type known as polyethylene. A difficulty is encountered in attempting to provide a leak-proof pressure seal around a polyethylene sheath because polyethylene when subjected to continuous high pressure over long periods of time tends to flow and thereby reduce the pressure, so that the seal is lost. In the embodiment of the present invention illustrated in Figures 8 and 9 there is shown a means for preventing such flow of the polyethylene at the seal. In this form of connection the cable, indicated at 1, extends into and through a stainless steel compartment 180 where the cable skids 41 are terminated. The compartment consists of an oversized pipe welded to lower and upper circular plates 181 and 182 through which the cable extends. The pipe is provided with a boss 183 for a pressure type fitting. The upper circular plate 182 has a centrally located cable-receiving opening 184. A centrally located metal tube or sleeve 185 is sealed around its entire periphery to the plate 182, as by welding. The tube 185 surrounds a series of parallel, uniformly spaced, axially extending bolt shanks 188 suitably secured to the plate 182. There may be six, eight or more such shanks distributed around the central cable-receiving opening 184.

A stack of annular gasket discs 189 is assembled on the bolts 188. Each disc has a central hole through which the polyethylene cable jacket 45 passes. Around the central hole there are a series of holes equal in number and spacing with the bolt shanks 188 so that the individual gasket discs may be slipped over the bolt shanks. The discs fit snugly within the tube or sleeve 185 and are stacked to a height almost equal to the height of the tube or sleeve 185. An annular metal plate 192 overlies the uppermost disc 189, the bolts 188 passing through the plate 192. The discs 189 are all of uniform outside diameter and of varying internal diameters. The center disc, midway between the top and bottom of the stack, has the smallest internal diameter, and the central openings in the respective discs both above and below the center disc are of progressively increasing diameters. The discs are of any gasketing material which will expand radially when subjected to axial pressure and which is not adversely affected by the oil or sealing compound within the terminator. After assembly of the stack of discs and after the cable has been inserted therethrough to its proper position it is possible to form a peripheral seal around the polyethylene sleeve 45 of the cable conductor by tightening of the nuts 194 that are threaded on the shanks 188, thereby forcing the plate 192 downwardly to compress the stack of discs axially. Upon axial compression of the discs they are expanded radially inwardly, being confined against outward expansion by the tube 185. On radial inward expansion of the stack of discs the center disc is first to contact and compresses against the polyethylene cable sleeve 45, as may be seen from Figure 9. Continued compression of the discs progressively forces more and more of the discs on opposite sides of the center disc first into contact with and then into pressure against the sheath 45 until the uppermost and lowermost discs are brought into pressure engagement with the polyethylene sheath 45. At this time the center disc will exert a maximum radial pressure against the sheath 45, and the discs on opposite sides of the center disc will exert progressively lesser pressure on the polyethylene sheath 45. Thus any tendency of the polyethylene of the sheath 45 to flow under the action of the pressure to which it is subjected by any disc will be resisted by the next or adjacent disc considered in a direction upwardly or downwardly from the center disc. The uppermost and lowermost discs exert less pressure than the minimum amount necessary to produce flow of the polyethylene but yet sufficient pressure to prevent flow under the action of the next adjacent disc.

The insulator 85 is mounted on the body 48', which corresponds to the body 48 of Figure 3, in the same manner as is the insulator of Figure 3, and the body 48' has a ring 51 therein similar to the corresponding ring of Figure 3, which supports the porcelain stress control tube in the same manner as in Figure 3.

It may be seen from Figure 1 that the equipotential line 32 extends radially outwardly to some extent at the place where it leaves the stress control cone 15. The greater the distance between the electrode 25 and the stress cone 15 the greater would be the radial component of the equipotential line 32 at the place where it leaves the stress control cone 15. In order that this component shall be kept at a minimum, that is, in order that the equipotential line 32 shall extend as nearly axially as possible at the place where it leaves the stress cone 15, it is essential that the electrode 25 shall be as close as possible to the stress cone 15. It is for that reason that the stress tube 21 is brought as close as possible to the stress cone and is made as thin as possible at its lower end, within reasonable manufacturing tolerances, and for that reason it is tapered at its lower end as seen in Figure 1, the taper being on the inner side. In view of the fact that the stress control tube 21 is not relied upon to hold the hydrostatic pressure that exists within the terminator, as is the insulator 85, it is apparent that the stress control tube can be made quite thin, within manufacturing tolerances, which permits the conducting glaze or electrode 25 to be brought very close to the stress cone 15. The outer insulator 85, on the other hand, must be made considerably thicker in view of its greater length and in view of the fact that it is required to hold the hydrostatic pressure within the terminator.

The equipotential line 32 extends from the porcelain stress control tube 21 downwardly, as seen in Figure 1, towards and through the insulator 85, leaving the insulator 85 at a point somewhat above the grounded adaptor 95 and sloped in a downwardly direction. The next equipotential line 33 is spaced considerably above the line 32 and of a lesser slope within the insulator 85. As a result of the downward slope of the equipotential lines, which is brought about by the fact that the inside grounded electrode 25 terminates substantially above the outside grounded adaptor 95, the potential gradient on the outside of the outer insulator 85, in a direction axially of the insulator, is substantially reduced. It is this that raises the external (outdoor air) flashover value. Since the external flashover value is thus raised it is possible to make the outer insulator 85 of a smaller overall length than would otherwise be required for the voltages involved if the porcelain stress control tube and its associated electrode 25 were not provided.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A terminator for a conductor of a high voltage cable, comprising a casing sealing the end of the cable and having an outer insulator into which the cable-conductor extends, a stress control cone surrounding said cable within said insulator, grounded supporting means for the insulator, a grounded electrode surrounding the wide portion of the stress control cone within the insulator and extending an appreciable distance beyond the grounded support and the stress cone in a direction axially towards the terminated end of the conductor, and a covering of solid insulation over the end of the electrode which is closest to the terminated end of the conductor, said covering comprising an insulating sleeve loosely surrounding the stress control cone and spaced therefrom to permit freedom of thermal expansion of the stress control cone without resulting mechanical stressing of the sleeve, and said sleeve fitting closely within said electrode.

2. A terminator for a conductor of a high voltage cable, comprising a casing sealing the end of the cable and having an outer insulator into which the cable-conductor extends, a stress control cone surrounding said cable within said insulator, grounded supporting means for the insulator, an insulating sleeve of solid insulation within the casing and loosely surrounding the stress control cone, said sleeve having an electrical conducting glaze on a portion of the surface thereof forming a grounded electrode surrounding the cable-conductor within the casing, said glaze extending an appreciable distance beyond the grounded support and said stress cone from a point contiguous to the wide portion of the cone in a direction axially toward the terminated end of the cable-conductor, and the end of said glaze nearest the terminated end of the conductor enveloped by the insulating sleeve.

3. In a terminator for a high voltage cable-conductor having a covering of solid insulation thereon, a sealed housing of insulation into which the cable-conductor extends and which seals the end of the conductor from the outside atmosphere, a grounded support for the insulator at one end thereof, and means for controlling the electrostatic field between the conductor and the grounded support comprising the cable insulation retained on the cable-conductor at the portion thereof within the housing which is past the grounded support, a stress control cone surrounding the conductor insulation, a ceramic insulator surrounding the stress cone within the insulating housing and extending from the cable-receiving end of the housing past the grounded support and radially spaced from the cone to permit expansion thereof, and a grounded shield within the housing and surrounding the end of the stress cone which is closest to the cable-conductor receiving end of the housing, said shield extending both above and below the top of the ground potential portions of the grounded support and being on the outside of the ceramic insulator within the housing and extending axially of the cable and being a distance from the stress insulating cone less than the thickness of the cable insulation and the end of said shield nearest the terminated end of the conductor being closely enveloped by the ceramic insulator, and a filling of poured insulation in said housing.

4. In a terminator for a high voltage insulated cable-conductor, a sealed housing of insulation into which the cable-conductor extends and which seals the end of the conductor from the outside atmosphere, an outer and grounded member surrounding the insulator at one end thereof and exposed to the atmosphere, and means for controlling the electrostatic field between the cable-conductor and the grounded member comprising the cable insulation retained on the cable-conductor at the portion thereof within the housing which is past the grounded member, an insulating stress cone surrounding the conductor insulation, a ceramic insulator surrounding the stress cone within the insulating housing and radially spaced from the cone to permit expansion thereof, and a grounded shield within the housing and surrounding the end of the stress cone which is closest to the cable-conductor receiving end of the housing, said shield extending past the grounded member and being on the outside of the ceramic insulator within the housing, and terminating within said ceramic insulator.

5. A terminator for a conductor of a high voltage cable, comprising a casing sealing the end of the cable and having an outer insulator into which the cable-conductor extends, supporting means for the insulator, a stress control cone surrounding said cable within said insulator, an electrode surrounding the stress control cone within the insulator and extending an appreciable distance beyond the support and the cone in a direction axially towards the terminated end of the conductor, a conductive connection between the electrode and the supporting means and maintaining the electrode at the potential of the supporting means, and solid insulation over the end of the electrode said solid insulation comprising a sleeve loosely surrounding the stress control cone and fitting closely within said electrode.

6. A terminator for a conductor of a high voltage cable, comprising a casing sealing the end of the cable and having an outer insulator into which the cable-conductor extends, supporting means for the insulator, a stress control cone surrounding said cable within said insulator, an insulating sleeve of solid insulation within the casing and loosely surrounding the wide portion of the stress cone, said sleeve having an electrical conducting glaze on a portion of the surface thereof forming an electrode surrounding the stress cone within the casing, a conductive connection between the electrode and the supporting means and maintaining the electrode at the potential of the supporting means, said glaze extending an appreciable distance beyond the grounded support and the wide portion of the stress cone in a direction axially towards the terminated end of the cable-conductor, and the end of said glaze nearest the terminated end of said conductor closely enveloped by the insulating sleeve.

7. In a termination for a high voltage cable-conductor having a covering of solid insulation thereon, a sealed housing including an insulator into which the cable-conductor extends and which seals the end of the conductor from the outside atmosphere, a grounded support for the insulator, and means for controlling the electrostatic field between the conductor and the support comprising the cable insulation retained on the cable-conductor at the portion thereof within the housing which is past the support, an insulating stress cone surrounding the conductor insulation, a ceramic insulator surrounding the stress cone within the insulating housing and extending from the cable-receiving end of the housing past the support toward the terminated end of the conductor and being radially spaced from the cone to permit expansion thereof, and a shield surrounding the wide end of the stress cone, said shield extending axially beyond the support toward the terminated end of the conductor and being on the outside of the ceramic insulator within the housing and spaced a distance from the stress insulating cone less than the thickness of the cable insulation, the end of said shield nearest the terminated end of said conductor closely enveloped by said ceramic insulator, and a filling of liquid poured insulation in said housing.

8. A high voltage pothead including a field controlling insulator comprising a hollow body of solid inorganic insulation tapered at one end to a portion of reduced thickness, a conducting glaze on the outside of the body and extending from said portion of reduced thickness and terminating between the ends of the insulator, a mass of insulation of said body abutting and surrounding the end of the conducting glaze that terminates between the two ends of the insulator, an outer insulator within which the field controlling insulator is located, means sealing the outer insulator, a filling of insulation under pressure in said outer insulator, a conductive support embracing and supporting the outer insulator, and an electrical connection between the support and the conducting glaze for controlling the relative potential of the two.

References Cited in the file of this patent

UNITED STATES PATENTS

| | | |
|---|---|---|
| 1,726,097 | Austin | Aug. 27, 1929 |
| 1,972,590 | Higgins | Sept. 4, 1934 |
| 1,994,267 | Austin | Mar. 12, 1935 |
| 2,082,055 | Higgins | June 1, 1937 |
| 2,228,089 | Skvortzoff | Jan. 7, 1941 |
| 2,280,032 | Brandt | Apr. 14, 1942 |
| 2,373,843 | Nicholas | Apr. 17, 1945 |
| 2,401,996 | Wetherill | June 11, 1946 |
| 2,474,930 | Brazier et al. | July 5, 1949 |

OTHER REFERENCES

Brandt et al.: Trans. A. I. E. E., vol. 60 (1941), pages 257–258.

Nicholas, J. H.: Trans. A. I. E. E., vol. 68, part II (1949), pages 1264–6.

Bosworth et al.: Trans. A. I. E. E., vol. 68, part II (1949), pages 1268–9.